United States Patent
Mao

(10) Patent No.: US 9,897,779 B2
(45) Date of Patent: Feb. 20, 2018

(54) CAMERA LENS SYSTEM WITH THREE LENS COMPONENTS

(71) Applicant: Apple Inc., Cupertino, CA (US)

(72) Inventor: Yalan Mao, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/050,967

(22) Filed: Feb. 23, 2016

(65) Prior Publication Data

US 2017/0090155 A1    Mar. 30, 2017

Related U.S. Application Data

(60) Provisional application No. 62/235,391, filed on Sep. 30, 2015.

(51) Int. Cl.
| | |
|---|---|
| *H04N 5/225* | (2006.01) |
| *G02B 13/16* | (2006.01) |
| *G02B 13/00* | (2006.01) |
| *G02B 9/12* | (2006.01) |
| *H04N 5/232* | (2006.01) |
| *G02B 5/00* | (2006.01) |
| *G02B 5/20* | (2006.01) |
| *G02B 7/04* | (2006.01) |

(52) U.S. Cl.
CPC ........... *G02B 13/0035* (2013.01); *G02B 9/12* (2013.01); *H04N 5/2252* (2013.01); *H04N 5/2254* (2013.01); *H04N 5/23212* (2013.01); *G02B 5/005* (2013.01); *G02B 5/208* (2013.01); *G02B 7/04* (2013.01)

(58) Field of Classification Search
CPC ...... G02B 13/0035; G02B 5/208; G02B 9/12; H04N 5/2252; H04N 5/2254; H04N 5/23212

USPC .................. 348/335, 340, 360; 359/716, 708
See application file for complete search history.

(56) References Cited

U.S. PATENT DOCUMENTS

| | | | |
|---|---|---|---|
| 6,560,037 | B2 | 5/2003 | Dou |
| 6,795,253 | B2 | 9/2004 | Shinohara |
| 6,804,067 | B2 | 10/2004 | Sato |
| 7,167,323 | B2 | 1/2007 | Isono |

(Continued)

FOREIGN PATENT DOCUMENTS

| | | |
|---|---|---|
| CN | 1650213 | 8/2005 |
| CN | 103502869 | 1/2014 |

(Continued)

OTHER PUBLICATIONS

Utility Model Patentability Evaluation Report issued by the Chinese Patent Office dated Feb. 8, 2017 for Chinese Patent for Utility Model No. ZL201620853219.0.

(Continued)

*Primary Examiner* — Sinh Tran
*Assistant Examiner* — Zhenzhen Wu
(74) *Attorney, Agent, or Firm* — Womble Bond Dickinson (US) LLP

(57) ABSTRACT

An optical imaging lens assembly that may have three lens components. All lens components may have positive refractive power. The first object side lens component has a plano object side surface. The remaining refracting surfaces may be aspheric. The second and third lens components may have a meniscus form. All three lens components may have the same index of refraction and Abbe number.

34 Claims, 3 Drawing Sheets

(56) References Cited

U.S. PATENT DOCUMENTS

| | | | |
|---|---|---|---|
| 7,206,143 B2* | 4/2007 | Kamo | G02B 9/34 |
| | | | 359/771 |
| 7,450,323 B2 | 11/2008 | Nakamura | |
| 7,453,509 B2 | 11/2008 | Losehand et al. | |
| 8,049,808 B2 | 11/2011 | Campbell | |
| 8,194,334 B2 | 6/2012 | Hsu et al. | |
| 8,270,098 B2 | 9/2012 | Fukuta et al. | |
| 8,559,118 B2* | 10/2013 | Engelhardt | G02B 13/004 |
| | | | 359/715 |
| 8,643,762 B2 | 2/2014 | Suzuki et al. | |
| 8,662,765 B2 | 3/2014 | Reshidko et al. | |
| 8,804,252 B2 | 8/2014 | Hsieh et al. | |
| 8,837,057 B2 | 9/2014 | Nihei | |
| 8,922,913 B2 | 12/2014 | Yin et al. | |
| 8,922,914 B2* | 12/2014 | Chen | G02B 13/004 |
| | | | 359/715 |
| 8,936,371 B2 | 1/2015 | Maruyama | |
| 2003/0002174 A1* | 1/2003 | Dou | G02B 13/0025 |
| | | | 359/719 |
| 2004/0150893 A1* | 8/2004 | Shinohara | G02B 9/16 |
| | | | 359/785 |
| 2004/0190162 A1 | 9/2004 | Sato | |
| 2007/0229971 A1* | 10/2007 | Souma | G02B 15/177 |
| | | | 359/686 |
| 2011/0001865 A1 | 1/2011 | Hirao et al. | |
| 2011/0096221 A1* | 4/2011 | Tsai | G02B 13/0035 |
| | | | 348/340 |
| 2012/0162785 A1 | 6/2012 | Ko | |
| 2013/0222927 A1* | 8/2013 | Kubota | G02B 13/0035 |
| | | | 359/716 |
| 2014/0049840 A1* | 2/2014 | Tsai | G02B 13/0035 |
| | | | 359/716 |
| 2014/0313395 A1 | 10/2014 | Lee | |
| 2014/0334016 A1 | 11/2014 | Yin et al. | |
| 2015/0080662 A1 | 3/2015 | Harada | |

FOREIGN PATENT DOCUMENTS

| | | |
|---|---|---|
| CN | 203519918 | 4/2014 |
| CN | 104391368 A | 3/2015 |
| EP | 1770422 A1 | 4/2007 |
| JP | 2004163851 A | 6/2004 |
| TW | M398125 | 2/2011 |
| TW | M459408 | 8/2013 |

OTHER PUBLICATIONS

Taiwan Office Action dated May 31, 2017 for ROC (Taiwan) Patent Application No. 105121621.

* cited by examiner

CAMERA LENS SYSTEM WITH THREE LENS COMPONENTS

BACKGROUND

Field

Embodiments of the invention relate to the field of lenses including a nonspherical surface; and more specifically, to lenses having three lens components.

Background

The advent of small mobile multipurpose devices such as smartphones, tablet or pad devices and laptop computers has resulted in a need for high resolution small form factor cameras for integration in the devices. In particular, there is a need for cameras that can be used in thin devices that may be less than 8 mm thick. It is desirable to provide a high quality lens that can be used for small form factor cameras in thin devices that may provide little space for the lens.

SUMMARY

An optical imaging lens assembly having three lens components is disclosed. All lens components may have positive refractive power. The first object side lens component has a plano object side surface. The remaining refracting surfaces may be aspheric. The second and third lens components may have a meniscus form. All three lens components may have the same index of refraction and Abbe number.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

Figure 1:
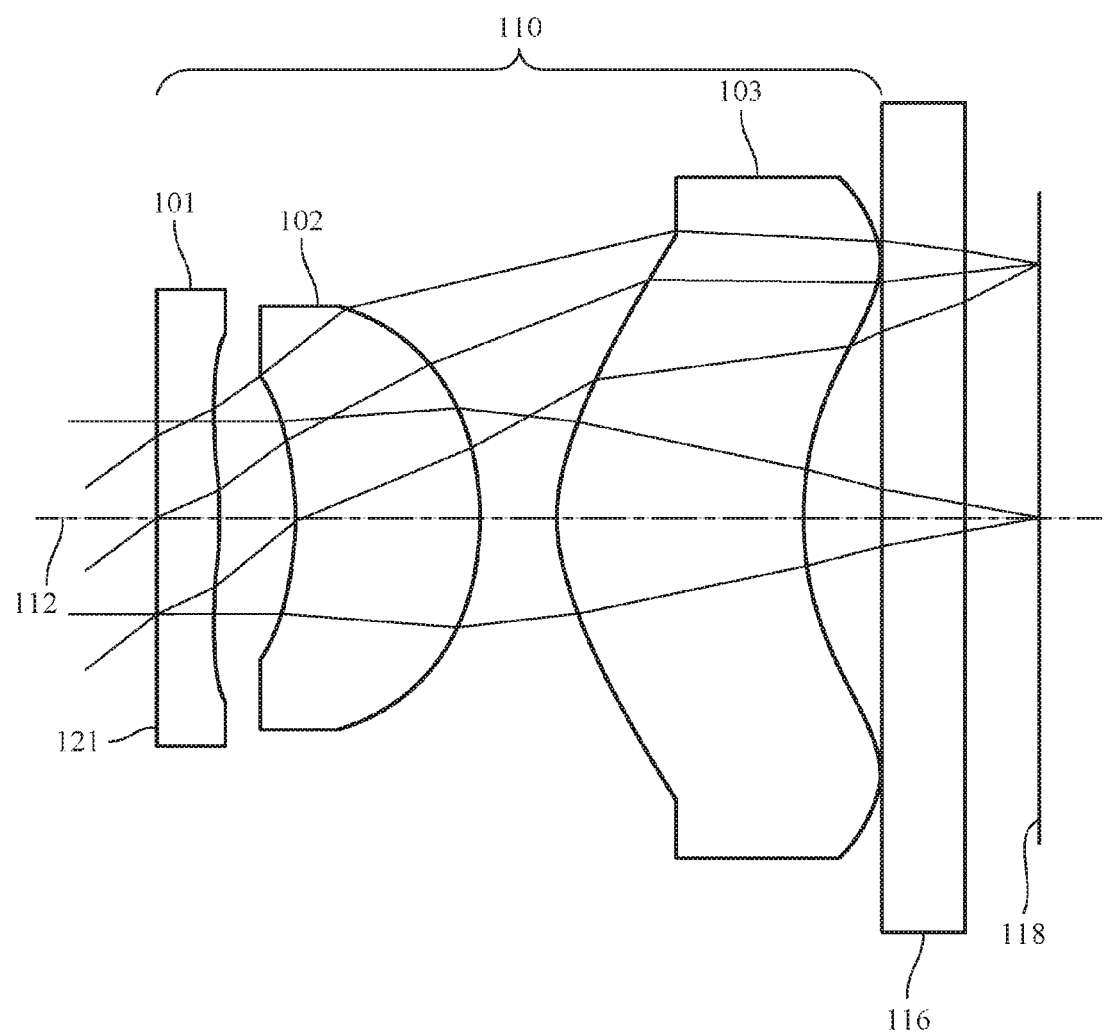
FIG. 1 is a cross-sectional illustration of a first example embodiment of a lens system that includes three refractive lens elements.

In the following description, numerous specific details are set forth. However, it is understood that embodiments of the invention may be practiced without these specific details. In other instances, well-known structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The term "optical axis" or simply "axis" as applied to a lens designates the axis of rotational symmetry of the lens.

The term "element" as applied to a lens designates any single transparent mass of refractive material having two opposed refracting surfaces, which surfaces are disposed transversely of the optical axis of the lens and spaced therealong.

The term "component" as applied to a lens designates either (1) a single transparent mass of refractive material having two opposed refracting surfaces, i.e. an element, or (2) a grouped plurality of such masses arranged in series along the optical axis of the lens with their adjacent refracting surfaces either in full overall contact or in spaced parallel relation with the spacing being of such small magnitude that it does not enter into the lens computations.

Radii of refractive surfaces are expressed as positive numbers when the center of the circle is on the image side of the refractive surface. They are expressed as negative numbers when the center of the circle is on the object side of the refractive surface. An object-side refractive surface having a positive radius is convex; one having a negative radius is concave. An image-side refractive surface having a positive radius is concave; one having a negative radius is convex. The term "convex" as applied to a lens surface indicates that the lens surface is convex where the surface intersects the optical axis. The term "concave" as applied to a lens surface indicates that the lens surface is concave where the surface intersects the optical axis.

The term "refractive power" as applied to a lens designates the degree to which a lens converges or diverges light near the optical axis. "Positive refractive power" is refractive power that bends the ray toward the optical axis, i.e. converges light. "Negative refractive power" is refractive power that bends the ray away from the optical axis, i.e. diverges light.

The term "aperture stop" or simply "stop" as applied to a lens designates an opening that determines the size of the bundle of rays that pass through the lens system.

The term "focal length" as used herein means effective focal length and not front focal length nor rear focal length.

An embodiment of a compact lens system for use with a small form factor camera is described. The camera may be implemented in a small package size while still capturing sharp, high resolution images, making embodiments of the camera suitable for use in small and/or mobile multipurpose devices such as cell phones, smartphones, pad or tablet computing devices, laptop, netbook, notebook, subnotebook, ultrabook computers, surveillance devices, and so on. However, aspects of the camera (e.g., the lens system and photosensor) may be scaled up or down to provide cameras with larger or smaller package sizes. In addition, embodiments of the camera system may be implemented as stand-alone digital cameras. In addition to still (single frame capture) camera applications, embodiments of the camera system may be adapted for use in video camera applications.

The refractive lens components may be composed of plastic materials. In at least some embodiments, the refractive lens elements may be composed of injection molded plastic material. However, other transparent optical materials may be used. Also note that, in a given embodiment, different ones of the lens elements may be composed of materials with different optical characteristics, for example different Abbe numbers and/or different refractive indices.

The camera may also, but not necessarily, include an infrared (IR) filter located between a last lens component of the lens system and the photosensor. The IR filter may, for example, be composed of a glass material. However, other materials may be used. Note that the IR filter does not affect the effective focal length of the lens system. Further note that the camera may also include other components in addition to those illustrated and described herein.

In the camera, the lens system forms an image at an image plane (IP) at or near the surface of the photosensor. The image size for a distant object is directly proportional to the effective focal length (f) of a lens system. The total track length (TTL) of the lens system is the distance on the optical axis (AX) between the front vertex at the object side surface of the first (object side) lens component and the image plane.

In the exemplary embodiment, the lens system is configured to have an effective focal length f that is at or about 0.56 millimeters (mm), an F-number (focal ratio, or F-number) that is at or about 2.2, a field of view (FOV) that is at or about 75 degrees (although narrower or wider FOVs may be achieved), and a total track (TTL) that is at or about 1.1 mm.

Note that the focal length f, F-number, and/or other parameters may be scaled or adjusted to meet various specifications of optical, imaging, and/or packaging constraints for other camera system applications. Constraints for a camera system that may be specified as requirements for particular camera system applications and/or that may be varied for different camera system applications include but are not limited to the focal length f, effective aperture, F-number, field of view (FOV), imaging performance requirements, and packaging volume or size constraints.

In some embodiments, the lens system may also be equipped with a focusing mechanism for focusing an object scene at infinity (object scene distance from camera>20 meters) to near object distance (<30 mm). For example, in some embodiments, the lens system as described herein may be equipped with adjustable focus mechanism wherein the lens system and/or photosensor at the image plane may be moved for focusing an object scene at distances ranging from greater than 20 meters to less than 30 mm.

While ranges of values may be given herein as examples of adjustable cameras and lens systems in which one or more optical parameters may be dynamically varied (e.g., using adjustable aperture stop and/or adjustable focus), embodiments of camera systems that include fixed (non-adjustable) lens systems in which values for optical and other parameters are within these ranges may be implemented.

FIG. 1 shows a cross-section view of the three refracting lens components 101, 102, 103 for the exemplary embodiment. This example is not intended to be limiting, and variations on the various parameters given for the lens system are possible while still achieving similar results. The three lens components 101-103 in the lens system 110 each have a refractive power and form a lens system having a focal length of f. The three lens components of the lens system 110 are arranged along an optical axis (AX) 112 from an object side to an image side as follows:

a first lens component 101 having a positive refractive power, a focal length $f_1$, a plano object side surface, and a convex image side surface;

a second lens component 102 having a positive refractive power and a focal length $f_2$, a concave object side surface, and a convex image side surface; and a third lens component 103 having a positive refractive power and a focal length $f_3$ a convex object side surface, and a concave image side surface.

The first object side lens surface 121, the object side surface of the first lens component 101, is plano (flat). The second and third lens components 102, 103 have a positive meniscus shape. In addition, at least one of the five curved lens surfaces is aspheric. In the exemplary embodiment shown, all five curved lens surfaces are aspheric.

The lens system 110 forms an image on or near the surface of an image sensor 118. A cover material 116, such as a cover glass or an infrared cut filter, may be placed between the lens system 110 and the image sensor 118.

The plano object side surface 121 of the lens system 110 may allow the lens system to be mounted in a device with less clearance between the front of the lens system and a surface placed in front of the lens system. This may allow the height of the device to be reduced.

Figure 2:
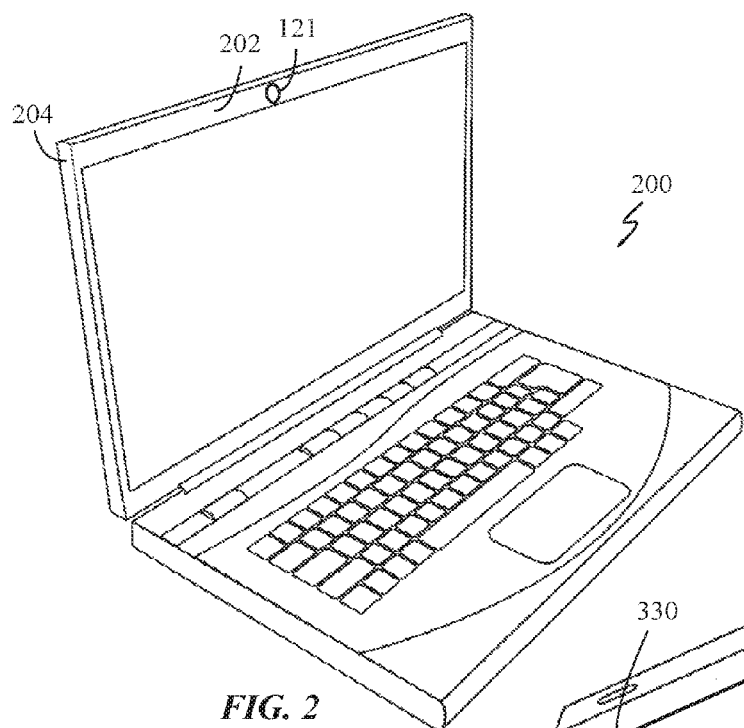
FIG. 2 is a perspective view of a portable device in which a camera module is integrated.

Referring now to FIG. 2, a perspective view of a portable device 200 in which a camera module using the lens system shown in FIG. 1 is integrated. The device 200 in this case may be a laptop or notebook computer. Of course, the camera module may alternatively be integrated in other types of portable devices, such as smart phones or tablet computers, and it may also be integrated within non-portable devices such as desktop personal computers, television monitors, or any other electronic device that has a particularly short profile in the Z-axis (Z-height).

In the case of the laptop or notebook computer, the device 200 may have a display screen in an outer housing that may provide a bezel 202 surrounding the display screen. The outer housing whose Z-height 204 is in the range of 8 mm or less, thereby being particularly suited to receive therein a camera module that has a Z-height within the range of 6 mm or less. The lens systems described herein are suitable for creating compact lens systems having a small Z-height. The front surface 121 of the lens system shown in FIG. 1 may be substantially flush with the forward facing surface of the bezel 202.

Figure 3:
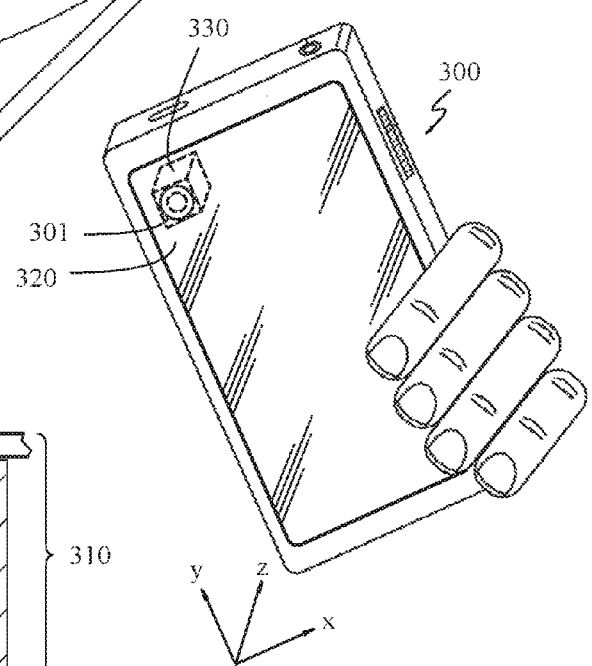
FIG. 3 is a perspective view of another portable device in which another camera module is integrated.

Referring now to FIG. 3, a perspective view of another portable device 300 in which another camera module 330 using a lens system in accordance with an embodiment of the invention is integrated. The device 300 in this case may be a smart phone or a tablet computer, which is a handheld device in the sense of being intended for use while held in a single hand of the user. Of course, the camera module 330 may alternatively be integrated in other types of portable devices, such as laptop or notebook computers, and it may also be integrated within non-portable devices such as desktop personal computers, television monitors, or any other electronic device that has a particularly short profile in the Z-axis (Z-height).

In the case of the smart phone or tablet computer, the device 300 has an outer housing in which is integrated a cellular network wireless communications circuit that enables the device to function as a mobile telephony terminal or end station. The device may have an outer housing whose Z-height is in the range of 8 mm or less, thereby being particularly suited to receive therein a camera module that has a Z-height within the range of 6 mm or less. The lens systems described herein are suitable for creating compact lens systems having a small Z-height.

In some embodiments the device 300 includes a housing having at least one transparent panel 320 that forms an exterior surface of the device. The camera module 330 may include a second lens component 302, a third lens component 303, a cover material 316, and an image sensor 318. The transparent panel 320 may include the first lens component 301 as a shaped portion of the panel.

Figure 4:
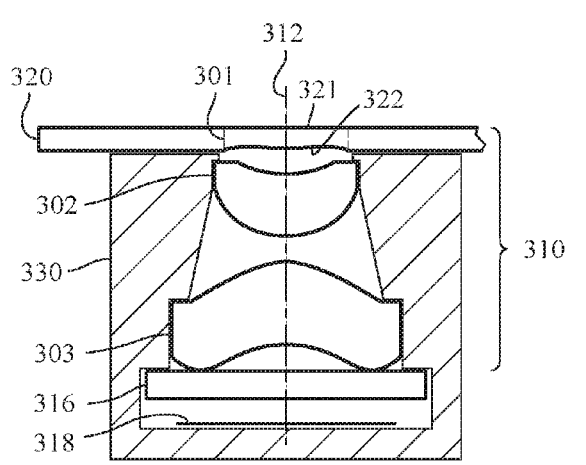
FIG. 4 shows a side view of the camera module and a portion of a transparent panel of the device shown in FIG. 3.

FIG. 4 shows a side view of the camera module 330 and a portion of the transparent panel 320 of the device 300 shown in FIG. 3. The first lens component 301 is formed as a portion of the transparent panel 320 as suggested by the two dashed lines drawn between the front, object side surface 321 and the rear, image side surface 322 of the portion of the transparent panel that forms the first lens component. It will be appreciated that the transparent panel 320 is continuous and uniform across the region that includes the first lens component 301. The dashed lines merely suggest the optical boundary of the first lens component 301 and not any physically perceptible boundary in the transparent panel 320.

The camera module 330 is assembled with the transparent panel 320 to align the first lens component 301 in the panel with the second and third lens components 302, 303 in the module along an optical axis 312 to provide a complete image forming optical system 310.

Figure 5:
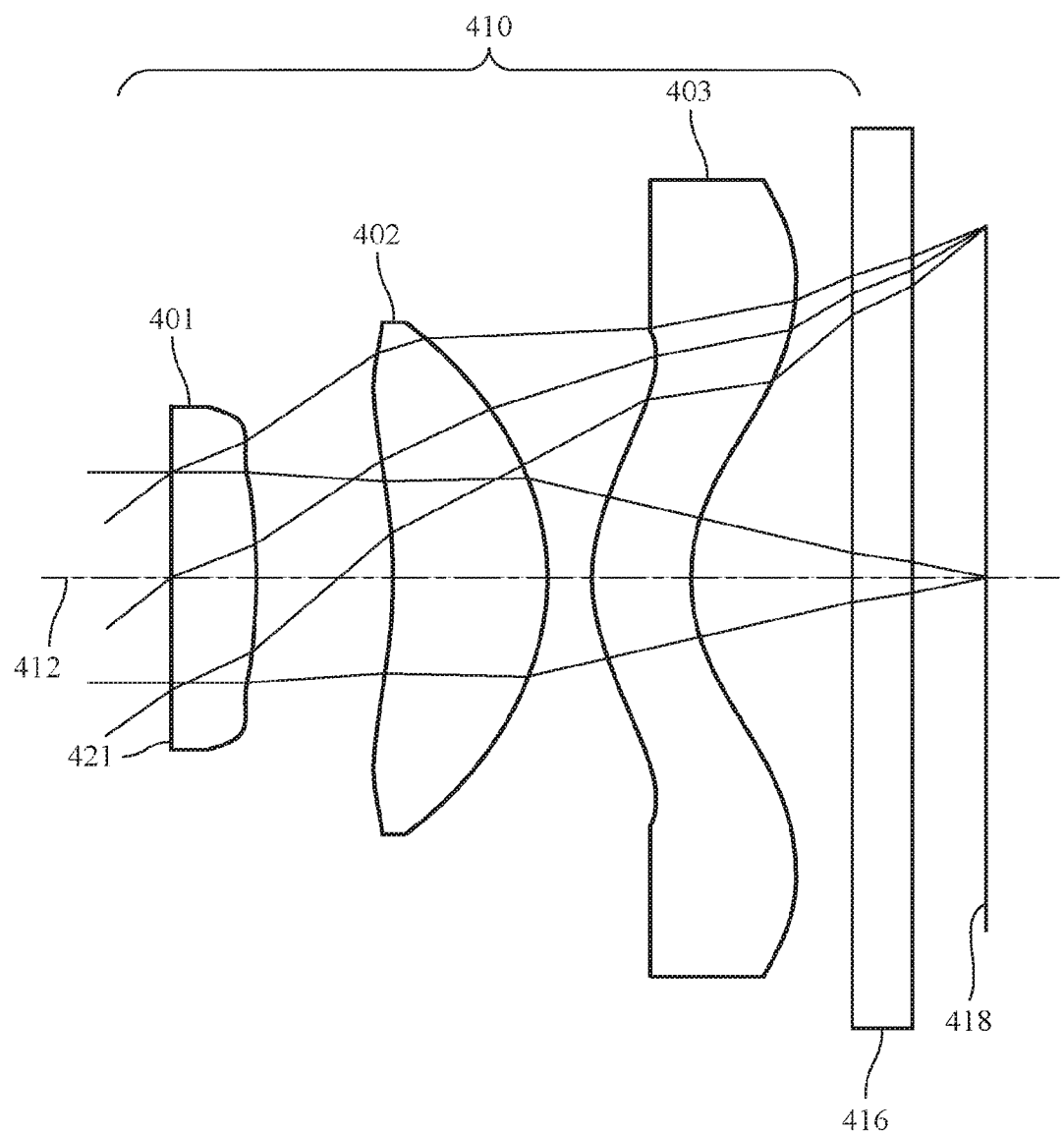
FIG. 5 is a cross-sectional illustration of a second example embodiment of a lens system that includes three refractive lens elements.

FIG. 5 shows a cross-section view of three refracting lens components 401, 402, 403 for a second exemplary embodiment. This example is not intended to be limiting, and variations on the various parameters given for the lens system are possible while still achieving similar results. The three lens components 401-403 in the lens system 410 each have a refractive power and form a lens system having a focal length of f. The three lens components of the lens system 410 are arranged along an optical axis (AX) 412 from an object side to an image side as follows:
 a first lens component 401 having a positive refractive power, a focal length $f_1$, a plano object side surface, and a convex image side surface;
 a second lens component 402 having a positive refractive power and a focal length $f_2$, a concave object side surface, and a convex image side surface; and
 a third lens component 403 having a positive refractive power and a focal length $f_3$ a convex object side surface, and a concave image side surface.

The first object side lens surface 421, the object side surface of the first lens component 401, is plano (flat). The second and third lens components 402, 403 have a positive meniscus shape. In addition, at least one of the five curved lens surfaces is aspheric. In the second exemplary embodiment shown, all five curved lens surfaces are aspheric.

The lens system 410 forms an image on or near the surface of an image sensor 418. A cover material 416, such as a cover glass or an infrared cut filter, may be placed between the lens system 410 and the image sensor 418.

The plano object side surface 421 of the lens system 410 may allow the lens system to be mounted in a device with less clearance between the front of the lens system and a surface placed in front of the lens system. This may allow the height of the device to be reduced.

The following Tables provide example values for various optical and physical parameters of the exemplary lens system as described herein and illustrated in FIGS. 1 and 5. Tables 1A and 1B provide an optical prescription for the example embodiment of the lens system 110 with three lens components 101-103 as illustrated in FIG. 1. Tables 2A and 2B provide an optical prescription for the example embodiment of the lens system 410 with three lens components 401-403 as illustrated in FIG. 5.

In the Tables, all dimensions are in millimeters unless otherwise specified. A positive radius indicates that the center of curvature is to the image side of the surface. A negative radius indicates that the center of curvature is to the object side of the surface. "INF" stands for infinity (as used in optics). "ASP" indicates an aspheric surface, and "FLT" indicates a flat surface. The thickness (or separation) is the axial distance from the intersection of a surface with the optical axis to the intersection of the next surface with the optical axis. The design wavelengths represent wavelengths in the spectral band of the imaging system.

For materials of the lens elements, window, wafer substrate, and IR filter, a refractive index $N_d$ at the helium d-line wavelength is provided, as well as an Abbe number $V_d$ relative to the d-line and the C- and F-lines of hydrogen. The Abbe number, $V_d$, may be defined by the equation:

$$V_d=(N_d-1)/(N_F-N_C),$$

where $N_F$ and $N_C$ are refractive index values of the material at the F and C lines of hydrogen, respectively.

Referring to the aspheric constants in Table 1B, the aspheric equation describing an aspherical surface may be given by:

$$Z = \frac{r^2}{1+\sqrt{1-(1+K)r^2}} + Ar^4 + Br^6 + Cr^8 + Dr^{10} + Er^{12} + Fr^{14}$$

where Z is the sag of the surface parallel to the Z-axis (for all embodiments the Z-axis coincides with the optical axis);
K is the conic constant; and
A, B, C, D, E, and F are the aspheric coefficients.
In the Tables "E" denotes exponential notation (powers of 10).

Note that the values given in the following Tables for the exemplary embodiment of the lens system are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the lens system. In particular, note that some of the values in the Tables may be scaled up or down for larger or smaller implementations of a camera using an embodiment of a lens system as described herein.

Further note that the surface numbers ($S_i$) of the elements in the various embodiments of the lens system as shown in the Tables are listed from the first surface 0 at the object plane to the last surface 9 at the image plane. The effective focal length of the lens systems is given by f. The total track length (TTL) of the lens systems is the distance along the optical axis between the object side surface of the first component $L_1$ and the image plane. An aperture stop (AS) (not shown), which may be located near the front object side lens component $L_1$, may determine the entrance pupil of the lens system. The lens system focal ratio or f-number is defined as the lens system effective focal length f divided by the entrance pupil diameter. The IR filter 116 may act to block infrared radiation that could damage or adversely affect the photosensor, and may be configured so as to have no effect on f.

Embodiments of the lens systems described herein cover applications in the visible region of the spectrum from 470 nanometers (nm) to 650 nm with a reference wavelength at 555 nm. The optical prescription in the following Tables provides high image quality for the stated f-number over 470 nm to 650 nm spectrum.

The three lens components $L_1$, $L_2$, and $L_3$ of the exemplary lens systems may be composed of plastic materials with refractive indices and Abbe numbers as listed in the Tables. In at least some embodiments, plastic materials may be used for the lens components. All three lens components $L_1$, $L_2$, and $L_2$ may be composed of a the same plastic material. The application of these plastic materials for the lens components allows the lens system to be optimized and corrected for chromatic aberrations over the visible region.

The lens component materials may be chosen and the refractive power distribution of the lens components may be calculated to satisfy the effective focal length f and correction of the field curvature or Petzval sum. The monochromatic and chromatic variations of optical aberrations may be reduced by adjusting the radii of curvature and aspheric coefficients or geometrical shapes of the lens components and axial separations as illustrated in the Tables to produce well corrected and balanced minimal residual aberrations.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

TABLE 1A

Optical data for a first exemplary embodiment shown in FIG. 1
f = 0.5639 mm, Fno = 2.2, HFOV = 37.5 deg, TTL = 1.059 mm

| $S_i$ | Component | $R_i$ | Shape | $D_i$ | Material | $N_d$ | $V_d$ | $f_i$ |
|---|---|---|---|---|---|---|---|---|
| 0 | Object plane | INF | FLT | INF | | | | |
| 1 | $L_1$ | INF | FLT | 0.079548 | Plastic | 1.535 | 56.1 | 2.896 |
| 2 | | −1.55332 | ASP | 0.100000 | | | | |
| 3 | $L_2$ | −0.52395 | ASP | 0.244898 | Plastic | 1.535 | 56.1 | 2.305 |
| 4 | | −0.42801 | ASP | 0.100000 | | | | |
| 5 | $L_3$ | 0.30738 | ASP | 0.322474 | Plastic | 1.535 | 56.1 | 1.135 |
| 6 | | 0.39315 | ASP | 0.101956 | | | | |
| 7 | IR filter | INF | FLT | 0.110000 | Glass | 1.517 | 64.2 | |
| 8 | | INF | FLT | 0.100000 | | | | |
| 9 | Image plane | INF | FLT | | | | | |

$S_i$: surface i
$R_i$: radius of surface i
$D_i$: distance between surface i and surface i + 1 along optical axis
$N_d$: index of refraction for material relative to d-line, 587.56 nm
$V_d$: Abbe number for material relative to d-line
$f_i$: focal length of lens component at 555 nm
Design wavelengths: 650 nm, 610 nm, 555 nm, 510 nm, 470 nm

TABLE 1B

Aspheric coefficients for the first exemplary embodiment

| $S_i$ | K | A | B | C |
|---|---|---|---|---|
| 2 | −95.705155 | 0.311858E+01 | −0.162181E+02 | 0.852881E+03 |
| 3 | 5.577920 | 0.706073E+01 | −0.113314E+03 | −0.796803E+02 |
| 4 | 1.226938 | −0.707465E+01 | 0.492155E+02 | −0.121150E+03 |
| 5 | −2.839956 | 0.103387E+01 | −0.475271E+01 | −0.221756E+02 |
| 6 | −0.713670 | −0.642737E−03 | −0.364121E+02 | −0.142529E+02 |

| $S_i$ | D | E | F |
|---|---|---|---|
| 2 | 0.399015E+04 | 0.484899E+04 | −0.310112E+04 |
| 3 | 0.809371E+04 | 0.478545E+04 | |
| 4 | −0.229816E+04 | −0.809035E+03 | |
| 5 | 0.386713E+02 | 0.211717E+02 | |
| 6 | 0.242787E+02 | 0.114039E+04 | |

TABLE 2A

Optical data for a second exemplary embodiment shown in FIG. 5
f = 0.8397 mm, Fno = 2.2, HFOV = 36.3 deg, TTL = 1.3219 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | $L_1$ | INF | FLT | 0.150000 | Plastic | 1.5445 | 56.98 | 2.2584 |
| 2 | | −1.23373 | ASP | 0.246148 | | | | |
| 3 | $L_2$ | −0.97389 | ASP | 0.276354 | Plastic | 1.5445 | 56.98 | 1.5745 |
| 4 | | −0.50253 | ASP | 0.080000 | | | | |
| 5 | $L_3$ | 0.36652 | ASP | 0.172973 | Plastic | 1.6425 | 22.47 | 12.1928 |
| 6 | | 0.31306 | ASP | 0.286431 | | | | |
| 7 | IR filter | INF | FLT | 0.110000 | Glass | 1.517 | 64.2 | |
| 8 | | INF | FLT | 0.130000 | | | | |
| 9 | Image plane | INF | FLT | | | | | |

$S_i$: Surface i
$R_i$: radius of surface i
$D_i$: distance between surface i and surface i + 1 along optical axis
$N_d$: index of refraction for material relative to d-line, 587.56 nm
$V_d$: Abbe number for material relative to d-line
$f_l$: focal length of lens component at 555 nm
Design wavelengths: 650 nm, 610 nm, 555 nm, 510 nm, 470 nm

TABLE 2B

Aspheric coefficients for the second exemplary embodiment

| $S_i$ | K | A | B | C |
|---|---|---|---|---|
| 2 | 1.332565 | 7.369450E−02 | 1.199650E+02 | −2.807970E+03 |
| 3 | 1.070518 | 1.941090E+00 | 1.330240E+01 | −2.621800E+02 |
| 4 | 0.187410 | −2.366200E+00 | 3.125770E+01 | −5.394360E+01 |
| 5 | −3.872297 | 9.16459E−01 | −1.634790E+01 | 1.945950E+01 |
| 6 | −1.014550 | −4.019080E+00 | −8.566400E−01 | 2.644680E+01 |

| $S_i$ | D | E | F |
|---|---|---|---|
| 2 | 1.183650E+04 | 6.492550E+05 | −7.199580E+06 |
| 3 | 2.004540E+03 | −4.838100E+03 | |
| 4 | −8.078170E+02 | 4.320400E+03 | |
| 5 | 2.773710E+01 | −1.709670E+02 | |
| 6 | −6.305220E+01 | 4.957750E+01 | |

What is claimed is:

1. An imaging lens assembly having an optical axis and a focal length of f, the imaging lens assembly comprising, in order from an object side to an image side:
   a first lens component with positive refractive power having a plano object-side surface, an image-side surface that is convex where the image-side surface intersects the optical axis, and a focal length of $f_1$ that satisfies the following relation:

$0.19 < f/f_1 < 0.38$;

a second lens component with positive refractive power; and
   a third lens component with positive refractive power.

2. The imaging lens assembly of claim 1 wherein the second lens component has an object-side surface that is concave where the object-side surface intersects the optical axis and an image-side surface that is convex where the image-side surface intersects the optical axis.

3. The imaging lens assembly of claim 2 wherein the third lens component has an object-side surface that is convex where the object-side surface intersects the optical axis and an image-side surface that is concave where the image-side surface intersects the optical axis.

4. The imaging lens assembly of claim 1 wherein the first lens component, second lens component, and third lens component are each formed from a single transparent mass of refractive material and all three lens components have the same index of refraction and Abbe number.

5. The imaging lens assembly of claim 1 wherein the image-side surface of the first lens component is an aspheric surface.

6. The imaging lens assembly of claim 5 wherein the image-side and object-side surfaces of the second and third lens component are aspheric surfaces.

7. The imaging lens assembly of claim 1 wherein $f_2$ is a focal length of the second lens component, and the following relation is satisfied:

$0.24 < f/f_2 < 0.54$.

8. The imaging lens assembly of claim 7 wherein $f_3$ is a focal length of the third lens component, and the following relation is satisfied:

$0.06 < f/f_3 < 0.50$.

9. A portable device comprising:
   an outer housing; and
   a digital camera integrated inside the outer housing, the digital camera having an optical imaging lens assembly having an optical axis and a focal length of f, the imaging lens assembly comprising, in order from an object side to an image side:
   a first lens component with positive refractive power having a plano object-side surface, an image-side surface that is convex where the image-side surface intersects the optical axis, and a focal length of $f_1$ that satisfies the following relation:

$0.19 < f/f_1 < 0.38$;

a second lens component with positive refractive power; and
   a third lens component with positive refractive power.

10. The portable device of claim 9 wherein the second lens component has an object-side surface that is concave where the object-side surface intersects the optical axis and an image-side surface that is convex where the image-side surface intersects the optical axis.

11. The portable device of claim 10 wherein the third lens component has an object-side surface that is convex where the object-side surface intersects the optical axis and an image-side surface that is concave where the image-side surface intersects the optical axis.

12. The portable device of claim 9 wherein the first lens component, second lens component, and third lens component are each formed from a single transparent mass of refractive material and all three lens components have the same index of refraction and Abbe number.

13. The portable device of claim 9 wherein the image-side surface of the first lens component is an aspheric surface.

14. The portable device of claim 13 wherein the image-side and object-side surfaces of the second and third lens component are aspheric surfaces.

15. The portable device of claim 9 wherein $f_2$ is a focal length of the second lens component, and the following relation is satisfied:

$$0.24 < f/f_2 < 0.54.$$

16. The portable device of claim 15 wherein $f_3$ is a focal length of the third lens component, and the following relation is satisfied:

$$0.06 < f/f_3 < 0.50.$$

17. The portable device of claim 9 wherein the outer housing includes a transparent panel and the first lens component is formed as a portion of the transparent panel.

18. The portable device of claim 9 wherein the portable device is a laptop computer having a clamshell structure including a base and a cover pivotally coupled to the base, and the outer housing is a part of the cover.

19. An imaging lens assembly having an optical axis and a focal length of f, the imaging lens assembly comprising, in order from an object side to an image side:
- a first lens component with positive refractive power having a plano object-side surface and an image-side surface that is convex where the image-side surface intersects the optical axis;
- a second lens component with positive refractive power and a focal length of $f_2$ that satisfies the following relation:

$$0.24 < f/f_2 < 0.54; \text{ and}$$

- a third lens component with positive refractive power.

20. The imaging lens assembly of claim 19 wherein the second lens component has an object-side surface that is concave where the object-side surface intersects the optical axis and an image-side surface that is convex where the image-side surface intersects the optical axis.

21. The imaging lens assembly of claim 20 wherein the third lens component has an object-side surface that is convex where the object-side surface intersects the optical axis and an image-side surface that is concave where the image-side surface intersects the optical axis.

22. The imaging lens assembly of claim 19 wherein the first lens component, second lens component, and third lens component are each formed from a single transparent mass of refractive material and all three lens components have the same index of refraction and Abbe number.

23. The imaging lens assembly of claim 19 wherein the image-side surface of the first lens component is an aspheric surface.

24. The imaging lens assembly of claim 23 wherein the image-side and object-side surfaces of the second and third lens component are aspheric surfaces.

25. The imaging lens assembly of claim 19 wherein $f_3$ is a focal length of the third lens component, and the following relation is satisfied:

$$0.06 < f/f_3 < 0.50.$$

26. A portable device comprising:
- an outer housing; and
- a digital camera integrated inside the outer housing, the digital camera having an optical imaging lens assembly having an optical axis and a focal length of f, the imaging lens assembly comprising, in order from an object side to an image side:
  - a first lens component with positive refractive power having a plano object-side surface and an image-side surface that is convex where the image-side surface intersects the optical axis;
  - a second lens component with positive refractive power and a focal length of $f_2$ that satisfies the following relation:

$$0.24 < f/f_2 < 0.54; \text{ and}$$

- a third lens component with positive refractive power.

27. The portable device of claim 26 wherein the second lens component has an object-side surface that is concave where the object-side surface intersects the optical axis and an image-side surface that is convex where the image-side surface intersects the optical axis.

28. The portable device of claim 27 wherein the third lens component has an object-side surface that is convex where the object-side surface intersects the optical axis and an image-side surface that is concave where the image-side surface intersects the optical axis.

29. The portable device of claim 26 wherein the first lens component, second lens component, and third lens component are each formed from a single transparent mass of refractive material and all three lens components have the same index of refraction and Abbe number.

30. The portable device of claim 26 wherein the image-side surface of the first lens component is an aspheric surface.

31. The portable device of claim 30 wherein the image-side and object-side surfaces of the second and third lens component are aspheric surfaces.

32. The portable device of claim 27 wherein $f_3$ is a focal length of the third lens component, and the following relation is satisfied:

$$0.06 < f/f_3 < 0.50.$$

33. The portable device of claim 27 wherein the outer housing includes a transparent panel and the first lens component is formed as a portion of the transparent panel.

34. The portable device of claim 27 wherein the portable device is a laptop computer having a clamshell structure including a base and a cover pivotally coupled to the base, and the outer housing is a part of the cover.

* * * * *